(12) United States Patent
Wakayama

(10) Patent No.: US 7,455,264 B2
(45) Date of Patent: Nov. 25, 2008

(54) RECONFIGURATION CONTROL SYSTEM FOR AN AIRCRAFT WING

(75) Inventor: Sean R. Wakayama, Huntington Beach, CA (US)

(73) Assignee: McDonnell Douglas Corporation, St. Louis, MO (US)

( * ) Notice: Subject to any disclaimer, the term of this patent is extended or adjusted under 35 U.S.C. 154(b) by 1826 days.

(21) Appl. No.: 08/917,480

(22) Filed: Aug. 26, 1997

(65) Prior Publication Data

US 2003/0197097 A1 Oct. 23, 2003

(51) Int. Cl.
B64C 3/50 (2006.01)
(52) U.S. Cl. .................................. 244/215
(58) Field of Classification Search ............... 244/215, 244/213, 199, 136, 75 R, 203
See application file for complete search history.

(56) References Cited

U.S. PATENT DOCUMENTS

| | | | | |
|---|---|---|---|---|
| 2,406,506 A | * | 8/1946 | Northrop | |
| 2,428,194 A | * | 9/1947 | Bockrath | |
| 2,492,245 A | * | 12/1949 | Sutton et al. | |
| 2,549,045 A | * | 4/1951 | Ashkenas | |
| 2,576,981 A | | 12/1951 | Vogt | 244/91 |
| 2,650,780 A | | 9/1953 | Northrop et al. | 244/13 |
| 3,120,935 A | * | 2/1964 | Perrin | |
| 3,204,895 A | * | 9/1965 | Razak | 244/136 |
| 3,536,278 A | | 10/1970 | Walley | 244/1 |
| 4,146,200 A | * | 3/1979 | Borzachillo | |
| 4,180,224 A | * | 12/1979 | Ryle | 244/199 |
| 4,247,065 A | * | 1/1981 | Grob et al. | 244/215 |
| 4,382,569 A | | 5/1983 | Boppe et al. | 244/199 |
| 4,455,004 A | | 6/1984 | Whitaker, Sr. | 244/90 |
| 4,466,586 A | | 8/1984 | Burnham | 244/75 R |
| 4,674,709 A | | 6/1987 | Welles | 244/45 |
| 4,720,062 A | | 1/1988 | Warrink et al. | 244/45 |
| 4,796,192 A | | 1/1989 | Lewis | 364/463 |

(Continued)

FOREIGN PATENT DOCUMENTS

DE 878604 * 1/1942 .............. 244/215

(Continued)

Primary Examiner—Tien Dinh
(74) Attorney, Agent, or Firm—Alston & Brid LLP

(57) ABSTRACT

Independently deflectable control surfaces are located on the trailing edge of the wing of a blended wing-body aircraft. The reconfiguration control system of the present invention controls the deflection of each control surface to optimize the spanwise lift distribution across the wing for each of several flight conditions, e.g., cruise, pitch maneuver, and high lift at low speed. The control surfaces are deflected and reconfigured to their predetermined optimal positions when the aircraft is in each of the aforementioned flight conditions. With respect to cruise, the reconfiguration control system will maximize the lift to drag ratio and keep the aircraft trimmed at a stable angle of attack. In a pitch maneuver, the control surfaces are deflected to pitch the aircraft and increase lift. Moreover, this increased lift has its spanwise center of pressure shifted inboard relative to its location for cruise. This inboard shifting reduces the increased bending moment about the aircraft's x-axis occasioned by the increased pitch force acting normal to the wing. To optimize high lift at low speed, during take-off and landing for example, the control surfaces are reconfigured to increase the local maximum coefficient of lift at stall-critical spanwise locations while providing pitch trim with control surfaces that are not stall critical.

20 Claims, 2 Drawing Sheets

U.S. PATENT DOCUMENTS

| | | | |
|---|---|---|---|
| 5,082,207 A | 1/1992 | Tulinius | 244/76 R |
| 5,088,661 A * | 2/1992 | Whitener | 244/75 R |
| 5,094,412 A | 3/1992 | Narramore | 244/214 |
| 5,255,881 A * | 10/1993 | Rao | |
| 5,288,039 A | 2/1994 | DeLaurier et al. | 244/219 |
| 5,538,202 A | 7/1996 | Thornburg | 244/215 |

FOREIGN PATENT DOCUMENTS

| | | | | |
|---|---|---|---|---|
| DE | 3423264 | * | 3/1985 | 244/213 |

* cited by examiner

RECONFIGURATION CONTROL SYSTEM FOR AN AIRCRAFT WING

This invention was made under Contract No. NAS 1-20275 awarded by NASA. The Government has certain rights in this invention.

BACKGROUND OF THE INVENTION

The present invention relates generally to aerodynamics and, more particularly, to a reconfiguration control system for optimizing the spanwise lift distribution on a blended wing-body aircraft by reconfiguring the deflection of trailing edge control surfaces.

There are primarily two types of aircraft configurations: the more common configuration which includes a tail section comprised of vertical and horizontal stabilizers located at the aft end of a tubular fuselage; and the tailless configuration. As to tailless aircraft, there are two sub-types: a first type which has no central body, commonly known as a "flying wing," and a second type having a central body which is blended into laterally extending wings.

Tailless aircraft possess the advantages of inherently lower weight and drag than a comparatively sized conventional aircraft having a fuselage and tail section. Several features of tailless aircraft effect these advantages. First, the need to enclose payloads in the wing results in thicker airfoil sections that are efficient at resisting bending loads, thereby lowering the necessary structural weight. Second, payload and fuel are distributed in the spanwise direction, which shifts the weight closer to where the lift is generated, thus reducing the structural loads that must be carried. Third, elimination of horizontal and vertical tail surfaces reduces the aircraft's wetted area and thus reduces parasite (skin friction) drag. These advantages have enticed aircraft designers to consider tailless configurations for a variety of military and commercial applications.

Tailless aircraft have several shortcomings that have frustrated those who seek to realize the significant advantages offered by this design. Because tail moment arms (the distance between the control surfaces and the center of gravity) are shorter, greater changes in local lift may be required to trim the airplane through different flight conditions. Deflecting control surfaces to trim the aircraft usually changes the spanwise lift distribution in a way that increases induced drag (drag from vortical energy imparted to the air in the process of generating lift).

Furthermore, tailless aircraft are more sensitive to shifts in location of the center of gravity along the longitudinal axis than are conventional aircraft having fuselages and tail sections. A shift in the center of gravity could be caused during flight by the use and transfer of fuel or by the movement of passengers and cargo. While conventional aircraft adjust to shifts in center of gravity with minimal change in wing lift distribution and drag characteristics, tailless aircraft require substantial changes in lift distribution that have a corresponding impact on drag. This presents a somewhat intractable problem that has impeded the development of a commercial airliner having a tailless design.

Based on the foregoing, it can be appreciated that there presently exists a need for a tailless aircraft which overcomes the above described shortcomings of the tailless aircraft of the prior art and which enhances the aerodynamic and weight advantages inherent to a tailless design. The present invention fulfills this need in the art.

SUMMARY OF THE INVENTION

The present invention encompasses a system to reconfigure the control surfaces and the resulting spanwise lift distribution of a blended wing-body aircraft, to optimize its aerodynamic characteristics in a number of flight regimes. Independently deflectable control surfaces are located on the trailing edge of the wing of the blended wing-body aircraft. The amount and direction of the deflection of each control surface has been determined so as to optimize the spanwise lift distribution across the wing for each of a variety of flight conditions. The control surfaces are accordingly deflected and reconfigured to their predetermined optimal positions when the aircraft is in each of the aforementioned flight conditions. Optimal control surface reconfigurations have been respectively calculated for the flight conditions of cruise, pitch maneuver, and low speed.

With respect to cruise, the control surfaces are reconfigured to achieve a spanwise lift distribution that optimizes the lift to drag ratio while maintaining the aircraft at a trimmed angle of attack. Only minimal deflections of control surfaces are necessary because the wing's baseline design is for optimal performance at the cruise condition.

In a pitch maneuver, the control surfaces are deflected to pitch the nose up or down, which increases loading on the wing frame. The control surfaces are reconfigured to achieve a spanwise lift distribution that minimizes the increased bending moments (about the bending axis) that necessarily result from increased loading on the wing. Minimizing the bending moments is desirable because increased bending moments require stronger aircraft structures, which means larger and heavier aircraft structures. The minimization of bending moments is achieved by deflecting the control surfaces to effect increased inboard lift in conjunction with decreased lift near the wing tips. Additionally, the deflected control surfaces provide the aircraft with additional pitch trim necessary for a pitch maneuver.

The primary considerations for low speed conditions (e.g., takeoff and landing) are maximizing lift and maintaining trim. At low speeds, the control surfaces are configured to improve maximum lift and delay stall while simultaneously trimming the airplane. Control surfaces are deflected downward in stall critical regions, increasing the maximum lift of those sections. In regions that are not stall-critical, control surfaces may be deflected upward to trim the airplane.

BRIEF DESCRIPTION OF THE DRAWINGS

These and various other features and advantages of the present invention will be readily understood with reference to the following detailed description read conjunction with the attached drawings, in which.

DETAILED DESCRIPTION OF THE INVENTION

Figure 1:
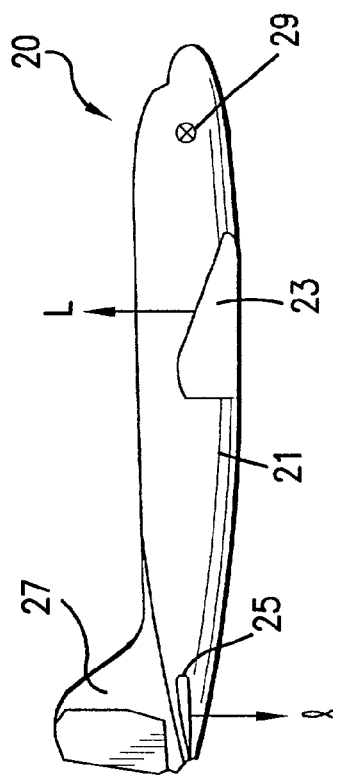
FIG. 1 is a schematic drawing of a conventional aircraft of the prior art having a tubular fuselage and an appended tail section which includes a vertical stabilizer and a horizontal stabilizer.

An exemplary conventional aircraft 20 having a tail section is schematically depicted in FIG. 1. Aircraft 20 includes tubular fuselage 21, wing 23, horizontal stabilizer 25, and vertical stabilizer 27. When loaded, aircraft 20 has center of gravity 29. Horizontal stabilizer 25 controls the rotation of aircraft 20 about the pitch axis passing through center of gravity 29. Vertical stabilizer 27 controls the rotation of aircraft 20 about the vertical, or "yaw," axis passing through center of gravity 29.

The vector L represents the lift generated by wing 23. The additional lift generated by fuselage 21 is small in comparison to the lift generated by wing 23, and will be ignored herein. The vector I represents the lift generated by horizontal stabilizer 25 and is adjusted as necessary to stabilize the pitch moments of the aircraft. The presence of horizontal stabilizer 25 and vertical stabilizer 27 contributes a significant component to the total drag coefficient for aircraft 20.

Another drawback inherent to aircraft 20 is the weight of fuselage 21. Fuselage 21 is present primarily to carry payload. Secondary functions of the fuselage are to provide a pitch moment arm of sufficient length to allow the pitch rotation of aircraft 20 to be controlled by the lift I generated by horizontal stabilizer 25 and to provide a yaw moment arm of sufficient length to allow the yaw rotation of aircraft 20 to be controlled by the force vector generated by vertical stabilizer 27.

Also, the conventional aircraft design demands that the wings sustain large bending moments. The wings experience large bending moments because a substantial portion of the weight of the aircraft is located in the fuselage, due to payload location and structural weight. Yet, the majority of lift generated by the aircraft is located on the wings. Wing 23 must, therefore, be designed to withstand the bending moment induced by the difference in centers of lift and weight, in addition to the forces and moments created by aircraft maneuvers. Strengthening of the wing requires more structural weight than would otherwise be called for, leading to higher take-off weights.

Figure 2:
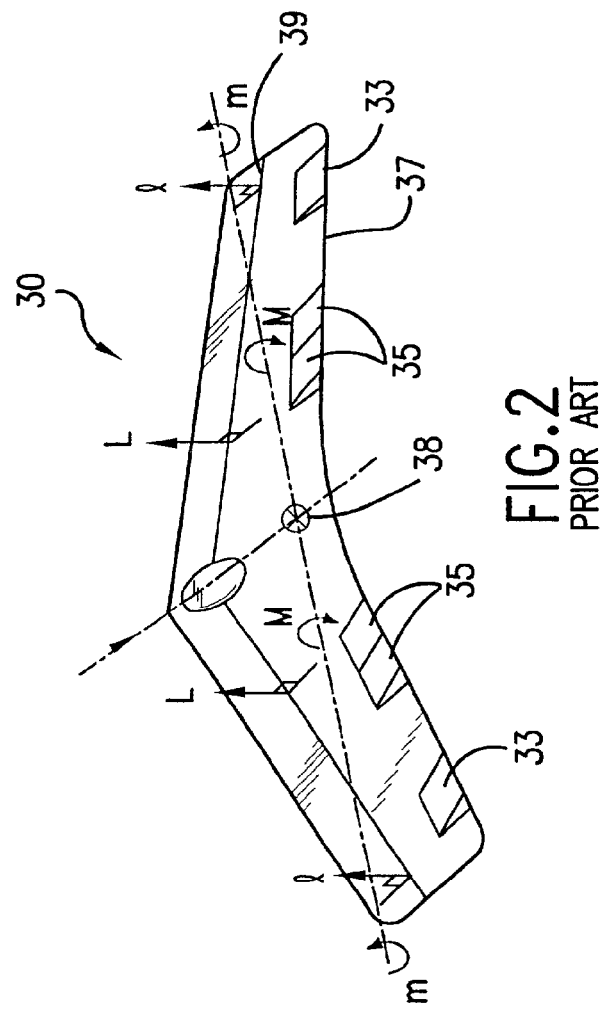
FIG. 2 is a schematic drawing of a tailless aircraft of the prior art.

The drawbacks inherent to conventional aircraft designs exemplified by aircraft 20 have led aeronautical engineers to consider tailless designs. A perspective view of an exemplary tailless aircraft 30 is schematically depicted in FIG. 2. Aircraft 30 includes deflectable reflexes 33, deflectable control surfaces 35, trailing edge 37, center of gravity 38, and center of pressure line 39. Reflexes 33 and control surfaces 35 are located in the trailing edge 37. Moreover, reflexes 33 are the most outboard of the deflectable control surfaces. Line 39 is the locus of the centers of pressure for the respective chordwise cross sections taken along the span of aircraft 30.

The flight of tailless aircraft 30 is controlled and stabilized by the appropriate deflections of control surfaces 35 and reflexes 33. Upward deflection of the control surfaces 35 moves the center of pressure for the entire wing forward, generating pitching moments that rotate the nose of the aircraft 30 in an upwardly direction. Similarly, downward deflection of the control surfaces 35 moves the center of pressure for the entire wing in an aft direction, generating pitching moments that rotate the nose of the aircraft in a downwardly direction. The steady-state angle-of-attack resulting from deflection of the control surfaces 35 depends upon the stability of the aircraft 30.

At forward center-of-gravity, the aircraft 30 will generally be in a stable configuration, with the lift due to angle-of attack generating nose-down pitching moments that must be countered by a net upward deflection of the control surfaces 35. When in an aft center-of-gravity configuration, the aircraft 30 is potentially unstable, with the lift due to angle-of-attack generating nose-up pitching moments that must be countered with a net downward defection of the control surfaces 35. When in such an unstable condition, the control system will deflect control surfaces 35 in an upward direction to pitch the aircraft 30 to the desired angle-of-attack and then deflect control surfaces 35 in a downward direction to maintain the angle-of-attack. The differences in controlling the aircraft 30 at forward and aft center-of-gravity provokes consideration of both conditions in determining the control surface deflection scheme. Reflexes 33, lying aft of the center-of-gravity 38 and having the longest pitching moment arm of all the control surfaces, are most effective at trimming the aircraft 30 to the desired angle of attack.

As may be discerned by cursory inspection of FIG. 2, tailless aircraft 30 has no horizontal and vertical stabilizers projecting into the ambient airstream, and thus has lower parasite drag than conventional aircraft 20. Moreover, since the flight of tailless aircraft 30 is controlled and stabilized without horizontal and vertical stabilizers, it does not utilize the moment arm to the aforementioned stabilizers otherwise provided by a fuselage. The absence of a fuselage further lowers the drag coefficient and weight of tailless aircraft 30 in comparison to conventional aircraft 20. Wing section 31 of tailless aircraft 30 may weigh less than wing 23 of aircraft 20 because the distribution of the structural and payload weights oppose the lift in such a way to reduce the bending moment.

Although tailless aircraft provide the aforementioned advantages over aircraft having a conventional fuselage and a tail section, tailless aircraft suffer from at least one major shortcoming. Namely, for tailless aircraft 30, the pitch moment arm from center of gravity 38 to the lift vector I generated by reflexes 33 is shorter than the corresponding pitch moment arm for aircraft 20 between center-of-gravity 29 and the negative lift I generated by horizontal stabilizer 25. This renders aircraft 30 more sensitive to changes in the longitudinal station of center-of-gravity 38, for example, due to a shift in the location of cargo or fuel during flight, or the placement of cargo during loading on the ground. Alternatively stated, the aerodynamic envelope for stable and controlled flight for tailless aircraft 30 is narrower and thus will tolerate less movement of loaded center-of-gravity 38, in comparison to the wider envelope for conventional aircraft 20. This characteristic makes it more challenging to design a tailless aircraft.

Figure 3:
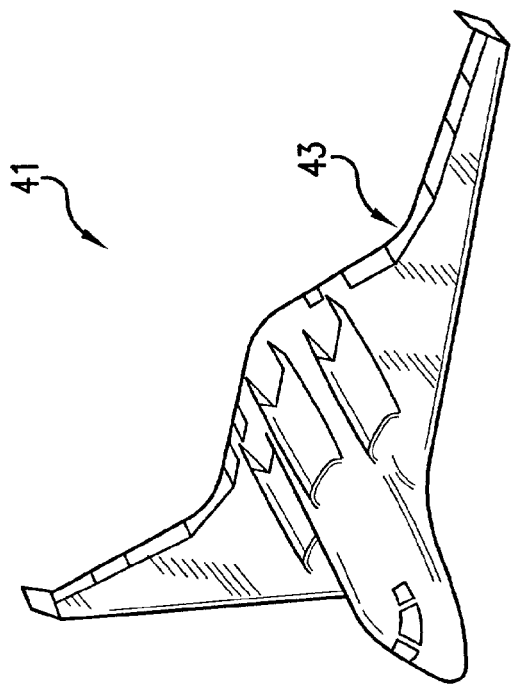
FIG. 3 is a perspective view of a blended wing-body aircraft incorporating the reconfigurable control surface system of the present invention.

FIG. 3 is a perspective view of blended wing-body aircraft 41, which incorporates a control surface reconfiguration system 43, which constitutes a preferred embodiment of the present invention. Although the preferred embodiment of the present invention is implemented in a blended wing-body aircraft, it could also be used to optimize the aerodynamic characteristics and reduce the weight of a conventional wing on a conventional aircraft having a tubular fuselage and an appended tail section, such as aircraft 20.

Figure 4:
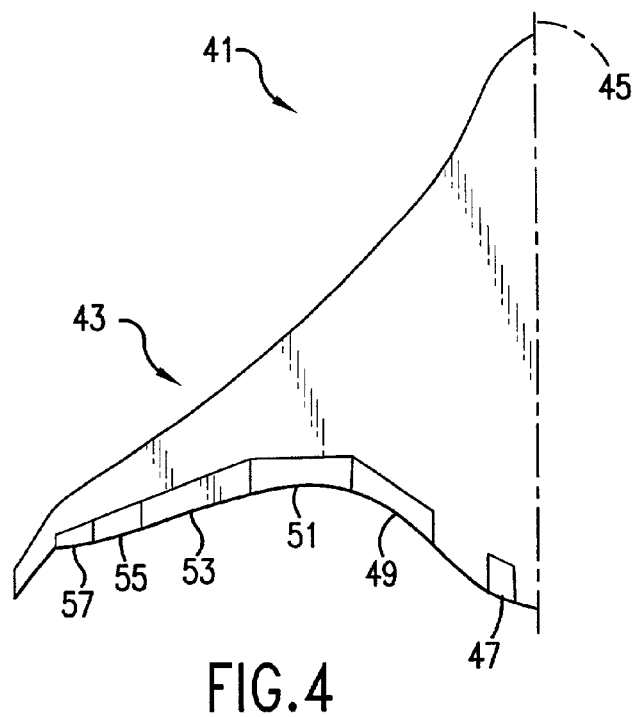
FIG. 4 is a perspective view of one side of the blended wing-body aircraft incorporating the reconfiguration control surface system of the present invention.

FIG. 4 is a perspective view of the half of aircraft 41 located on one side of longitudinal axis of symmetry 45. The remaining half of aircraft 41 is the mirror image of that shown in FIG. 4, and is omitted for the sake of brevity. Aircraft 41 includes six deflectable control surfaces: 47, 49, 51, 53, 55, and 57. The aforementioned control surfaces are independently deflectable, and located on the trailing edge of aircraft 41. The present invention is not limited to any particular number or spanwise location of control surfaces.

An optimum reconfiguration of control surfaces 47, 49, 51, 53, 55 and 57 has been calculated for each of four flight conditions: cruise, forward and aft center of gravity pitch maneuvers, and maximum lift at low speed.

Cruise

Figure 5:
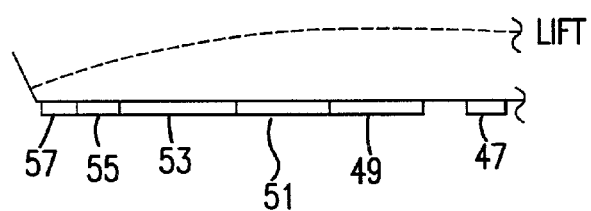
FIG. 5 depicts the reconfiguration of the control surfaces and the spanwise lift distribution for cruise.

For the cruise condition, the control surfaces are reconfigured to maximize the lift to drag ratio and to keep the aircraft trimmed at a stable angle of attack. The optimal lift distribution minimizes compressibility drag and lift-dependent viscous drag. As shown in FIG. 5, this is accomplished with only slight downward deflection of each of the control surfaces because the wing's baseline design is for optimal performance in this condition. The resultant spanwise lift distribution is also shown in FIG. 5.

Pitch Maneuver

Figure 6:
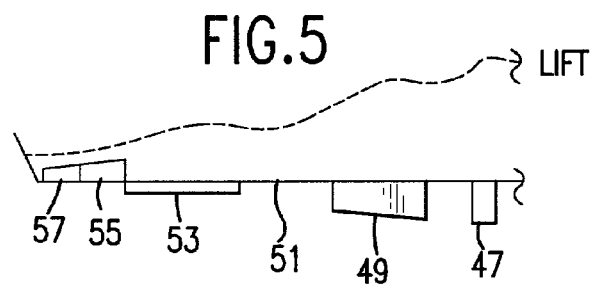
FIG. 6 depicts the reconfiguration of the control surfaces and the spanwise lift distribution for a pitch maneuver.

The deflections of the respective control surfaces for the pitch maneuver condition are shown in FIG. 6. The inboard control surfaces 47 and 49 are deflected appreciably downward to generate significant lift; control surface 51 remains undeflected; control surface 53 is deflected slightly downward; and outboard control surfaces 55 and 57 are deflected upward to reduce lift. The lift generated by this configuration trims aircraft 41 at an increased angle of attack and corresponding increased total lift. However, the extent of inboard and outboard control surface deflections necessary to trim the aircraft will depend on the center of gravity location.

FIG. 6 also shows a typical spanwise lift distribution generated by the control surface deflection configuration of the present invention. The foregoing deflection reconfiguration causes the bending moment about axis of symmetry 45 caused by the lift for this maneuver to be less than the bending moment if the same lift was obtained using the conventional deflection reconfiguration of the control surfaces. This is because the lift is obtained by downwardly deflecting inboard control surfaces 47 and 49 a significant amount, while upwardly deflecting outboard surfaces 55 and 57 a lesser amount. The reconfiguration of the present invention takes into account the longer moment arms for outboard control surfaces 55 and 57, in comparison to the shorter moment arms for inboard control surfaces 47 and 49.

The reduction of the bending moment acting on the wing allows the wing structure to be designed with less strength than would be the case if a conventional reconfiguration of the control surfaces were used, and the weight of the structure can be concomitantly reduced.

Low Speed

Figure 7:
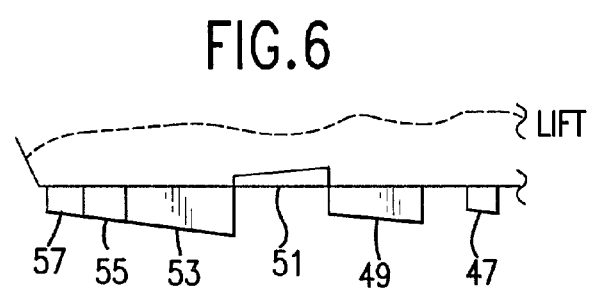
FIG. 7 depicts the reconfiguration of the control surfaces and the spanwise lift distribution for maximum lift at low speed.

FIG. 7 shows the control surface reconfiguration for maximum lift in a low speed condition, such as occurs during landings and take-off. Inboard control surfaces 47 and 49 and outboard control surfaces 53, 55, and 57 are deflected downward an appreciable amount to increase the maximum lift at stall-critical regions. Only control surface 51 is deflected upward to trim the aircraft. For some combinations of wing configuration and flight condition fewer stall-critical regions exist, resulting in the need for fewer downwardly deflected control surfaces. In such cases, more control surfaces may be deflected upward to trim the aircraft, achieving trim with lower deflection angles and lower drag.

EXAMPLES

As an example, the control surface deflections called for by the reconfiguration control surface system of the present invention were calculated assuming its use on a blended wing-body aircraft having the parameters set out in Table 1. Table 2 sets out the deflections which will provide optimal performance in each of the noted flight conditions. In accordance with common convention, a positive deflection is downward, and a negative deflection is upward. This example assumes that no slats are included on the leading edge.

TABLE 1

| | |
|---|---|
| range | 6286 nautical miles |
| lift to drag ratio | 23.0 |
| cruise e | 0.70 |
| cruise angle of attack | 2.9° |
| maneuver angle of attack, aft center of gravity | 3.9° |
| maneuver angle of attack, forward center of gravity | 4.9° |
| landing angle of attack | 17.8° |
| cruise SM | −0.18° |
| landing SM | 0.05° |

TABLE 2

| % ½ span | 0.0 | 9.1 | 22.7 | 40.9 | 59.1 | 77.3 | 100.0 | 0 w | 100 w |
|---|---|---|---|---|---|---|---|---|---|
| inc. | 0.0° | 0.0° | 2.3° | 2.8° | −3.6° | −1.0° | 3.6° | 2.0° | 1.0° |
| cruise | 8.0° | | −2.8 | 0.8 | 4.5 | 0.7 | | | |
| aft center of gravity | 19.5 | | −7.0 | 1.9 | 11.0 | 1.7 | | | |
| forward center of gravity | −2.6° | | 0.9° | −0.3° | −1.5° | −0.2° | | | |
| high lift, low speed | −15.0° | | −15.0° | −8.8° | 4.7° | 5.6° | | | |

The use of the deflection configurations of the present invention is not limited to a blended wing-body aircraft or conventional wing that does not have leading edge slats. Indeed, it was determined by theoretical calculations that the cruise performance of a blended wing body aircraft using the control surface configurations of the present invention was compromised without slats. Theoretical calculations which incorporated leading edge slats from 59.1% semi-span to the outboard wing tip indicate that the use of such slats provides a more efficient cruise spanwise lift distribution using minimal deflections of the trailing edge control surfaces.

A second illustrative example was calculated using slats on the leading edge of a blended wing-body aircraft having the parameters set out in Table 3. Table 4 sets out the control surface deflections which will provide optimal performance in each of the noted flight conditions. In accordance with common convention, a positive deflection is downward, and a negative deflection is upward.

TABLE 3

| | |
|---|---|
| range | 7378 nautical miles |
| lift to drag ratio | 27.7 |
| cruise e | 0.94 |
| cruise angle of attack | 4.1° |
| maneuver angle of attack, aft center of gravity | 5.2° |
| maneuver angle of attack, forward center of gravity | 6.2° |
| landing angle of attack | 18.1° |
| cruise SM | −0.19° |
| landing SM | 0.06° |

TABLE 4

| % ½ span | 0.0 | 9.1 | 22.7 | 40.9 | 59.1 | 77.3 | 100.0 | 0 w | 100 w |
|---|---|---|---|---|---|---|---|---|---|
| inc. | 0.0° | 0.0° | −1.3° | −0.7° | 0.4° | 1.5° | 2.0° | 1.8° | 1.5° |
| cruise | −1.8° | | 0.6 | −0.8 | 0.1 | −0.4 | | | |
| aft center of gravity | 11.0 | | −3.8 | 4.6 | −0.3 | 2.5 | | | |
| forward center of gravity | −13.3 | | 4.5 | −5.5 | 0.4 | −3.0 | | | |
| high lift at low speed | −13.9 | | 13.9 | 11.3 | −27.8 | −27.8 | | | |

Although a presently preferred embodiment of the invention has been described in detail hereinabove, it should be clearly understood that many variations and/or modifications of the basic inventive concepts taught herein which may appear to those skilled in the pertinent art will still fall within the spirit and scope of the present invention as defined in the appended claims.

What is claimed is:

1. A tailless aircraft, including:
a wing having a trailing edge and independently deflectable flight control surfaces located along the trailing edge, the wing being capable during flight of generating a normal lifting force having a spanwise force distribution across the wing; and
a control surface reconfiguration system wherein, for each of a plurality of different flight conditions, the flight control surfaces are selectively reconfigurable to respective predetermined positions, which in combination, optimize the spanwise force distribution across the wing for each of the plurality of different flight conditions including a low speed flight condition wherein first selected ones of the deflectable flight control surfaces located at stall-critical spanwise locations are positioned to increase a local coefficient of lift and other deflectable flight control surfaces are positioned to control pitch trim.

2. The aircraft as set forth in claim 1, wherein:
the lifting force generates a moment acting on the wing; and,
the control surface reconfiguration system also minimizes the moment for at least one of the different flight conditions.

3. The aircraft as set forth in claim 2, wherein:
the control surface reconfiguration system minimizes the moment for structurally crucial flight conditions.

4. The aircraft as set forth in claim 1, wherein the control surface reconfiguration system also trims the wing.

5. The aircraft as set forth in claim 1, wherein:
one of the different flight conditions comprises cruise, with the wing having a lift-to-drag ratio during cruise; and
the control surface reconfiguration system functions to maximize the lift-to-drag ratio of the wing during the cruise flight condition.

6. The aircraft as set forth in claim 1 wherein the plurality of flight conditions include a pitch maneuver wherein the deflectable flight control surfaces are positioned to minimize the bending moment with respect to a bend axis of the wing.

7. The aircraft as set forth in claim 1, wherein:
one of the different flight conditions comprises a pitch maneuver; and,
the control surface reconfiguration system functions to achieve the required lifting force during the pitch maneuver flight condition.

8. The aircraft as set forth in claim 7, wherein:
the aircraft has a longitudinal axis of symmetry; and,
the control surface reconfiguration system functions to shift the spanwise force distribution towards the longitudinal axis without reducing lifting force, during the pitch maneuver flight condition.

9. The aircraft as set forth in claim 1, wherein the aircraft is a blended wing-body aircraft.

10. The aircraft as set forth in claim 1, wherein the different flight conditions include cruise, takeoff, and pitch maneuvers.

11. An aircraft, including:
a wing having a trailing edge and independently deflectable control surfaces located along the trailing edge, the wing being capable during flight of generating a normal lifting force having a spanwise force distribution across the wing; and
reconfiguration means for selectively reconfiguring the control surfaces to respective predetermined positions, which in combination, are effective to optimize the spanwise force distribution across the wing for each of a plurality of different flight conditions including a low speed flight condition wherein selected ones of the deflectable flight control surfaces located at stall-critical spanwise locations are positioned to increase a local coefficient of lift and other deflectable flight control surfaces are positioned to control pitch trim.

12. The aircraft as set forth in claim 11, wherein:
the lifting force generates a moment acting on the wing; and,
the reconfiguration means functions to minimize the moment for at least one of the different flight conditions.

13. The aircraft as set forth in claim 11, wherein:
the control surface reconfiguration system minimizes the moment for the structurally crucial flight conditions.

14. The aircraft as set forth in claim 11, wherein the reconfiguration means also trims the wing.

15. The aircraft as set forth in claim 11, wherein:
one of the different flight conditions comprises cruise, with the wing having a lift-to-drag ratio during cruise; and,
the reconfiguration means functions to maximize the lift-to-drag ratio during the cruise flight condition.

16. The aircraft as set forth in claim 11, wherein the plurality of flight conditions include a pitch maneuver wherein the deflectable flight control surfaces are positioned to minimize the bending moment with respect to a bend axis of the wing.

17. The aircraft as set forth in claim 11, wherein:
one of the different flight conditions comprises a pitch maneuver; and,
the reconfiguration means functions to maximize the lifting force during the pitch maneuver flight condition.

18. The aircraft as set forth in claim 17, wherein:
the aircraft is a blended wing-body with a longitudinal axis of symmetry; and,
during the pitch maneuver, the reconfiguration means functions to shift the spanwise force distribution towards the longitudinal axis without reducing the lifting force.

19. A method for controlling flight of a blended wing-body, tailless aircraft which includes a wing having a trailing edge and independently deflectable flight control surfaces located along the trailing edge which are deflectable in upward and downward directions, the wing being capable during flight of generating a normal lifting force having a spanwise distribution across the wing, the method including the steps of:

predetermining for each of a plurality of different flight conditions the respective position for each of the flight control surfaces, which in combination, optimize the spanwise force distribution across the wing for each of said different flight conditions including a low speed flight condition wherein first selected ones of the deflectable flight control surfaces located at stall-critical spanwise locations are positioned to increase a local coefficient of lift and other deflectable flight control surfaces are positioned to control pitch trim;
subjecting said aircraft to at least one of said different flight control conditions; and
reconfiguring the control surfaces upwardly or downwardly to the respective predetermined positions when subjecting said aircraft to each of said at least one flight control conditions to optimize the spanwise force distribution across the wing.

20. The method as set forth in claim 19, including the step of reconfiguring the control surfaces to control trim of the aircraft.

\* \* \* \* \*

UNITED STATES PATENT AND TRADEMARK OFFICE
CERTIFICATE OF CORRECTION

| | | |
|---|---|---|
| PATENT NO. | : 7,455,264 B2 | Page 1 of 1 |
| APPLICATION NO. | : 08/917480 | |
| DATED | : November 25, 2008 | |
| INVENTOR(S) | : Wakayama | |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 1826 days Delete the phrase "by 1826 days" and insert -- by 2099 days --

Signed and Sealed this

Thirteenth Day of April, 2010

David J. Kappos
*Director of the United States Patent and Trademark Office*